(12) United States Patent
Henriksson et al.

(10) Patent No.: US 8,812,797 B2
(45) Date of Patent: Aug. 19, 2014

(54) MEMORY CONTROLLER WITH EXTERNAL REFRESH MECHANISM

(75) Inventors: Tomas Henriksson, Sollentuna (SE); Elisabeth Steffens, Eindhoven (NL)

(73) Assignee: NXP, B.V., Eindhoven (NL)

( * ) Notice: Subject to any disclaimer, the term of this patent is extended or adjusted under 35 U.S.C. 154(b) by 298 days.

(21) Appl. No.: 12/855,493

(22) Filed: Aug. 12, 2010

(65) Prior Publication Data

US 2011/0113204 A1    May 12, 2011

(30) Foreign Application Priority Data

Aug. 14, 2009    (EP) ..................................... 09167883

(51) Int. Cl.
 *G06F 12/14*    (2006.01)
(52) U.S. Cl.
 USPC ............ 711/151; 370/294; 711/106; 711/118
(58) Field of Classification Search
 USPC ........................... 711/106, 151, 118; 370/294
 See application file for complete search history.

(56) References Cited

U.S. PATENT DOCUMENTS

| | | | |
|---|---|---|---|
| 5,873,114 A | 2/1999 | Rahman et al. | |
| 7,020,741 B1 | 3/2006 | Tischler | |
| 2003/0070038 A1* | 4/2003 | Komoto | 711/106 |
| 2006/0248318 A1* | 11/2006 | Zohner et al. | 712/225 |

FOREIGN PATENT DOCUMENTS

WO    2010/052679 A1    5/2010

OTHER PUBLICATIONS

S. Dutta, et al. "Viper: A Multiprocessor SOC for Advanced Set-Top Box and Digital TV System," IEEE Design & Test of Computers, pp. 21-31 (Sep.-Oct. 2001).
Claasen, T. "System on a Chip: Changing IC Design Today and in the Future," IEEE vol. 23, No. 3, pp. 20-26 (Jun. 2003)xx.
Extended European Search Report for European Patent Appln. No. EP09167883.9 (Sep. 9, 2009).

\* cited by examiner

*Primary Examiner* — Jae Yu

(57) ABSTRACT

The invention relates to a memory controller for use in a System-on-Chip, wherein the System-on-Chip comprises a plurality of agents and an off-chip volatile memory. The memory controller comprises a first port (CBP) for receiving low-priority requests (CBR) for access to the volatile memory from a first-subset of the plurality of agents and a second port (LLP) for receiving high-priority requests (LLR) for access to the volatile memory from a second-subset of the plurality of agents, wherein the memory controller is configured for arbitrating between the high-priority requests (LLR) and the low-priority requests (CBR), wherein the memory controller is configured for receiving refresh requests (RFR) for the volatile memory via the first port (CBP), wherein the refresh requests (RFR) are time-multiplexed with the low-priority requests (CBR), wherein the memory controller is configured for treating the low-priority requests (CBR) and the refresh requests (RFR) the same. The effect is that the arbitration between the different requests is rendered less complex. In embodiments of the memory controller there is also an average latency reduction for the high-priority requests. The invention further relates to a System-on-Chip comprising the memory controller, to a method of a refresh request generator for use in such System-on-Chip. The invention also relates to a method of controlling access of a System-on-Chip to a volatile memory, wherein the System-on-Chip comprises a plurality of agents which need access to the volatile memory, and to a computer program product comprising instructions for causing a processor to perform such method.

10 Claims, 2 Drawing Sheets

MEMORY CONTROLLER WITH EXTERNAL REFRESH MECHANISM

This application claims the priority under 35 U.S.C. §119 of European patent application no. 09167883.9, filed on Aug. 14, 2009, the contents of which are incorporated by reference herein.

FIELD OF THE INVENTION

The invention relates to a memory controller for use in a System-on-Chip connected to an off-chip volatile memory, wherein the System-on-Chip comprises a plurality of agents, which need access to the volatile memory. The invention further relates to a System-on-Chip comprising such memory controller. The invention also relates to a refresh request generator for use in such System-on-Chip. The invention relates to a method of controlling access of a System-on-Chip to an off-chip volatile memory, wherein the System-on-Chip comprises a plurality of agents which need access to the non-volatile memory and to a computer program product comprising instructions for causing a processor to perform such method.

BACKGROUND OF THE INVENTION

Multi-core architectures have recently attracted substantial attention, because of the increasing difficulty to push processor core speeds beyond the few GHz mark already reached some years back. Therefore the computer devices industry has recently focused on instantiating the same processor core multiple times (dual-core, quad-core) and improving communication mechanisms between multiple cores. In contrast, the consumer devices industry has always looked at heterogeneous compute platforms that utilize a mix of industry-standard CPU, fixed-point DSP, VLIW, and function-specific HW cores, an example being the Nexperia™ platform [see also the following publications: "S. Dutta et al. Viper: A multiprocessor SOC for Advanced Set-Top Box and Digital TV Systems. IEEE Design & Test of Computers, September-October 2001, pages 21-31"; and "Claasen, T.A.C.M.: System on a chip: changing IC design today and in the future, Micro, IEEE, Volume 23, Issue 3, May-June 2003, pages 20-26"]. An important advantage of the heterogeneous platform approach is that algorithms can be executed on the processor core that is best suited for them. Functional subsystems, consisting of several co-operating algorithms, are implemented on a single processor core, possibly supported by function-specific HW cores. The functional subsystems have well-defined communication interfaces, which make debug and system integration effort low. Recent advances in CMOS technology allow integration of an ever growing number of processor cores on a single die. This high level of integration offers a cost reduction, whilst at the same time increasing competition for usage of scarce shared HW resources.

A common architecture for a System-on-Chip (SoC) is one where there are several agents (IP cores, IP blocks, functional blocks, etc) that access the shared memory (for example a DRAM or an SDRAM) via a memory controller. In such architecture the memory controller arbitrates between requests (transactions with the memory) from the different agents. In certain SoCs from NXP the requests are split up into two categories, low-latency (LL) requests and constant-bandwidth requests (CB). In those SoCs, the CB-requests are guaranteed a limited latency and a constant transaction rate by an accounting mechanism, i.e. in order to do so a so-called CB-account has to be maintained, which keeps track of the latitude with respect to the latency-rate guarantee of the CB stream. The LL-requests have the highest priority and the CB-requests are serviced when there are no LL-requests. When the CB-account reaches a certain threshold value (boost value), which indicates that the guarantee is about to be violated, the LL-requests are blocked and the CB-requests get serviced. In that way the CB-requests get the guaranteed maximum latency and a minimum rate (bandwidth). This is implemented in the IP2032 memory controller, used in several SoCs from NXP. It is also included in the IP2035 memory controller.

The memory that is shared amongst the plurality of agents is generally a volatile memory (DRAM, SDRAM) that requires refresh commands. A further context of the invention is that the memory is a separate chip or chipset. This implies certain problems and limitations to be overcome. The access path is via pins, which are very costly in terms of area, etc. The limited number of pins reduces the available memory access bandwidth to a level which is barely enough for the memory requirements. This makes the memory bandwidth a system bottleneck. The memory is shared by the agents, both in terms of memory space as well as, more importantly, in terms of memory access bandwidth.

In the known SoC, refresh commands are generated internally in the memory controller by a refresh command generator (RCG). Refresh commands normally have the lowest priority, but both LL and CB-requests are blocked when there is a risk of data loss in the memory. The RCG in the memory controller issues a refresh command with a regular period. Such refresh command remains pending until it is serviced by the memory controller. The RCG also counts the number of refresh commands. When a refresh command is serviced the number is decreased. There is a maximum allowed number of pending refresh commands. That number is dependent on the type of the memory (here DRAM) and the configuration of the RCG. Typical values are between 2 and 8. When the maximum allowed number of refresh commands is reached a refresh command has to be serviced. This is achieved by blocking both the LL-requests and CB-requests until the number of pending refresh commands is decreased again.

LL-requests are thus blocked when the maximum allowed number of pending requests has its maximum value and/or when the CB-account value is lower than the threshold value (boost value). CB-requests are only blocked when the maximum allowed number of pending requests has its maximum value.

As illustrated above, a problem of the known memory controller is that the internal arbitration between the low-latency (high-priority) requests and the constant bandwidth (low-priority) requests is rendered relatively complicated because of the refresh commands which may sometimes get a higher-priority than the other requests, i.e. the memory controller effectively works with three levels of priority.

SUMMARY OF THE INVENTION

It is an object of the invention to provide a memory controller in which the internal arbitration is simplified.

The invention is defined by the independent claims. The dependent claims define advantageous embodiments.

In a first aspect, the invention relates to a memory controller for use in a System-on-Chip connected to an off-chip volatile memory, wherein the System-on-Chip comprises a plurality of agents, which need access to the volatile memory. The memory controller comprises a first port for receiving low-priority requests for access to the volatile memory from a first-subset of the plurality of agents and a second port for receiving high-priority requests for access to the volatile memory from a second-subset of the plurality of agents, wherein the memory controller is configured for arbitrating between the high-priority requests and the low-priority requests. The memory controller is configured for receiving refresh requests for the volatile memory via the first port, wherein the refresh requests are time-multiplexed with the low-priority requests, wherein the memory controller is configured for treating the low-priority requests and the refresh requests the same.

The effect of the features of the invention is as follows. Instead of creating internal refresh commands the memory controller is now configured for receiving refresh requests in the same stream as the low-priority requests with which they have been time-multiplexed. By doing so, the need to use the refresh commands to block the low-priority requests and the high-priority requests is completely rendered superfluous. The inventors have discovered that such approach is possible, because in the memory controller of the prior art the requirements for the refresh commands and the low-priority requests are very similar. In the invention the inventors suggest to replace the internal refresh command generator with a refresh request generator (this may be done in any place in the SoC as long as the refresh requests are in the same format as the low-priority requests). This implies that the memory controller now only needs to arbitrate between the low-priority requests and the high-priority requests, instead of also taking into account refresh commands which have become very critical and need to overrule the priority setting. Next to the larger simplicity there is the additional advantage that in the last stage of the memory controller (i.e. command selection stage) time is saved as only commands from two different sources have to be checked, i.e. a memory controller with a better timing closure can be obtained.

It must be noted that it is possible that the first sub-set and second sub-set of the plurality of agents may overlap, i.e. that some agents may require multiple memory accesses having different requirements. However, such variations do not depart from the general architecture wherein within the memory controller differently-prioritized memory requests having different requirements have to be handled and arbitrated.

In an embodiment of the memory controller in accordance with the invention the arbitrating comprises determining the order in which the high-priority requests and the low-priority requests may be serviced by the memory.

In an embodiment of the memory controller in accordance with the invention the high-priority requests are latency-critical. Latency-critical requests are an appropriate candidate to be given high-priority in a stream of requests.

In an embodiment of the memory controller in accordance with the invention the low-priority requests are latency-tolerant. Latency-tolerant requests are an appropriate candidate to be given low-priority in a stream of requests.

In an embodiment of the memory controller in accordance with the invention the memory controller is configured for guaranteeing, at request stream level, for the low-priority requests a minimum guaranteed bandwidth and a maximum latency to the volatile memory. In SoCs such minimum bandwidth requirement is often "seen" in combination with a higher latency tolerance.

In an embodiment of the memory controller in accordance with the invention the memory controller is configured for arbitrating between the high-priority requests and the low-priority requests such that, in operational use, i) the high-priority requests that are pending on the second port are serviced first, and
ii) the low-priority requests that are pending on the first port are serviced when there are no high-priority requests pending, unless the guaranteeing of the minimum guaranteed bandwidth and the maximum latency is at risk, in which case the low-priority requests are serviced ahead of pending high-priority requests until the minimum guaranteed bandwidth and the maximum latency can be guaranteed again.

The arbitration scheme of this embodiment is particularly advantageous in embodiments where the high-priority requests are latency-critical and the low-priority requests are latency-tolerant, while at the same time requiring the minimum guaranteed bandwidth and the maximum latency to the memory. The guaranteeing of the minimum guaranteed bandwidth and the maximum latency can be obtained by using an accounting mechanism. Different accounting mechanisms are possible and known from the prior art. The applicability of the invention is not dependent on which type of accounting is performed by the memory controller.

An embodiment of the memory controller in accordance with the invention further comprises a first time-multiplexer for time-multiplexing the low-priority requests with the refresh requests, wherein the first time-multiplexer comprises inputs being coupled to the first sub-set of the plurality of agents and an output being coupled to the first port. Furthermore, at least one of the inputs is configured for receiving the refresh requests. Using a time-multiplexer, also being referred to as concentrator in the prior art, makes it possible to share the volatile memory between many different agents.

In an embodiment of the memory controller in accordance with the invention the first time-multiplexer comprises a slot-based-arbiter for assigning time slots to respective pending requests in which they are transmitted from the respective inputs to the first port. Other arbiters are also possible. What is important is that guarantees on the output of the time-multiplexer are translated to guarantees on the inputs. A slot-based-arbiter conveniently matches transaction based accounting as illustrated in the description. The time slots may also be referred to as transaction slots.

In an embodiment of the memory controller in accordance with the invention the first port comprises a first port output, wherein the first port is configured for extracting low-priority bursts from the low-priority requests and the refresh requests and sequentially releasing said low-priority bursts on the first port output. Furthermore, the second port comprises a second port output, the second port being configured for extracting high-priority bursts from the high-priority requests and sequentially releasing said high-priority bursts on the second port output, wherein the memory controller further comprises:
i) an accounting unit being coupled to the first port and being configured for monitoring the arbitrating between said requests;
ii) a first queue having a first queue input and a first queue output, wherein the first queue input is coupled to the first port output for storing a predefined number of low-priority bursts, wherein the first queue comprises a first command generator connected to the first queue output for generating low-priority commands from the low-priority bursts;
iii) a control gate for conditionally blocking high-priority requests from the second port;
iv) a second queue having a second queue input and a second queue output, wherein the second queue input is coupled to the second port output for storing a predefined number of high-priority bursts, wherein the second queue is coupled to the second port output via the control gate that is controlled by the accounting unit, wherein the second queue comprises a second command generator connected to the second queue output for generating high-priority commands from the high-priority bursts, and v) a command-selection stage comprising a first command input coupled to the first command generator and a second command input coupled to the second command generator, the command selection stage being configured for selecting the command to be sent to the volatile memory.

The configuration (which is an example implementation of the SoC) of this embodiment is derived from a known configuration, with the major advantage that the complexity is greatly reduced because of the invention. A few differences are mentioned here. In the prior art configuration there were two control gates instead of one in this embodiment (in the high-priority queue). The control gate that remains is now only controlled by the accounting unit instead of by the accounting unit AND the refresh command generator (which is no longer there either). The command-selection stage no longer gets the refresh commands and is thus less complex, i.e. it only needs to prioritize between the two queues. For completeness, a consequence of the configuration of this embodiment is that the refresh requests are processed in the same queue as the low-priority requests. This also implies that the first command generation stage now also has to generate refresh commands from refresh requests. The command generation stages in this embodiment are considered as forming part of the queue. However, such definition is arbitrary; such blocks may also be considered as separate blocks connected to the queues. The queues may comprise DDR bursts from different requests (transactions), one being in a transfer-phase and the other in a preparation phase.

An embodiment of the memory controller in accordance with the invention further comprises a second time-multiplexer for time-multiplexing the high-priority requests, wherein the second time-multiplexer comprises further inputs being coupled to the second sub-set of the plurality of agents and a further output being coupled to the second port.

In an embodiment of the memory controller in accordance with the invention the second time-multiplexer comprises a high-priority controller for assigning further time slots to respective pending requests in which they are transmitted from the respective further inputs to the second port.

An embodiment of the memory controller in accordance with the invention further comprises a refresh request generator for generating the refresh requests. The refresh request generator may be advantageously integrated in the memory controller.

In a second aspect, the invention relates to a System-on-Chip comprising the memory controller in accordance with the invention. Such System-on-Chip (Soc) benefits from the advantages of the memory controller. The SoC benefits to even a larger extent from the memory controller in case of embodiments wherein the memory controller comprises internal queues for more efficient memory usage. In those embodiments the high-priority requests (for example low-latency) requests obtain a smaller average latency, which is advantage for the complete system, i.e. the system's performance is increased.

An embodiment of the System-on-Chip in accordance with the invention further comprises a refresh request generator for generating the refresh requests, wherein the refresh request generator is a separate agent or is incorporated in one of the agents.

In a third aspect, the invention relates to a refresh request generator for use in the System-on-Chip in accordance with the invention. The refresh request generator is a new unit to be used with the memory controller and the System-on-Chip in accordance with the invention. It may be implemented as being part of the memory controller, but it may also be sold as a separate (programmable) agent/IP block to be used in any System-on-Chip having a shared memory that is controlled by a memory controller. Therefore, the scope of the invention also includes such refresh request generator as such.

In a fourth aspect, the invention relates to a memory controller for use in a System-on-Chip connected to an off-chip volatile memory, wherein the System-on-Chip comprises a plurality of agents, which need access to the volatile memory, wherein the memory controller comprises a port for receiving requests for access to the volatile memory from the plurality of agents, wherein the memory controller is configured for receiving refresh requests for the volatile memory via the first port, wherein the refresh requests are time-multiplexed with the requests to obtain a single request stream, wherein the memory controller is configured for servicing the single request stream. The inventors have realized that the concept of generating refresh requests and time-multiplexing them with memory access requests is also applicable to memory controllers with only one port for receiving requests. Also in such memory controllers the situation may occur that refresh commands need to be serviced with higher priority than the access requests in order to prevent data loss. Generating and time-multiplexing refresh requests with the access requests renders the arbitration extremely simple, i.e. the need for a control gate is rendered completely superfluous (requests are processed in the order they arrive at the port). All embodiments discussed in relation with the first aspect of the invention are applicable mutatis mutandis for the memory controller in accordance with this aspect of the invention.

In a fifth aspect, the invention relates to a method of controlling access of a System-on-Chip to an off-chip volatile memory, wherein the System-on-Chip comprises a plurality of agents which need access to the volatile memory. The method comprises:

receiving low-priority requests for access to the volatile memory from a first-subset of the plurality of agents;

receiving high-priority requests for access to the volatile memory from a second-subset of the plurality of agents;

receiving refresh requests for the volatile memory, wherein the refresh requests are time-multiplexed with the low-priority requests, and arbitrating between the high-priority requests and the low-priority requests, wherein the low-priority requests and the refresh requests are treated the same. The embodiments of the controller and the System-on-Chip described in this description are just examples. Many variations are possible. However, all such variations, when used in operation, effectively perform the method as described in this paragraph and therefore do not depart from the scope of the invention as claimed. The embodiments of the method correspond with the earlier-mentioned embodiments of the memory controller.

In a sixth aspect, the invention relates to a method of controlling access of a System-on-Chip to an off-chip volatile memory, wherein the System-on-Chip comprises a plurality of agents which need access to the volatile memory, the method comprising:

receiving access requests for access to the volatile memory from the plurality of agents;

receiving refresh requests for the volatile memory, wherein the refresh requests are time-multiplexed with the access requests to obtain a single request stream, and servicing the single request stream.

This method in accordance with this aspect of the invention fully complies with the memory controller in accordance with the fourth aspect of the invention. The same effects and advantages apply.

In a seventh aspect, the invention relates to a computer program product comprising instructions for causing a processor to perform the method in accordance with the invention. The functionality described in relation with the invention can be implemented in hardware, in software, or in any hybrid configuration containing both hardware and software functionality.

These and other aspects of the invention are apparent from and will be elucidated with reference to the embodiments described hereinafter.

LIST OF REFERENCE NUMERALS

Figure 1:
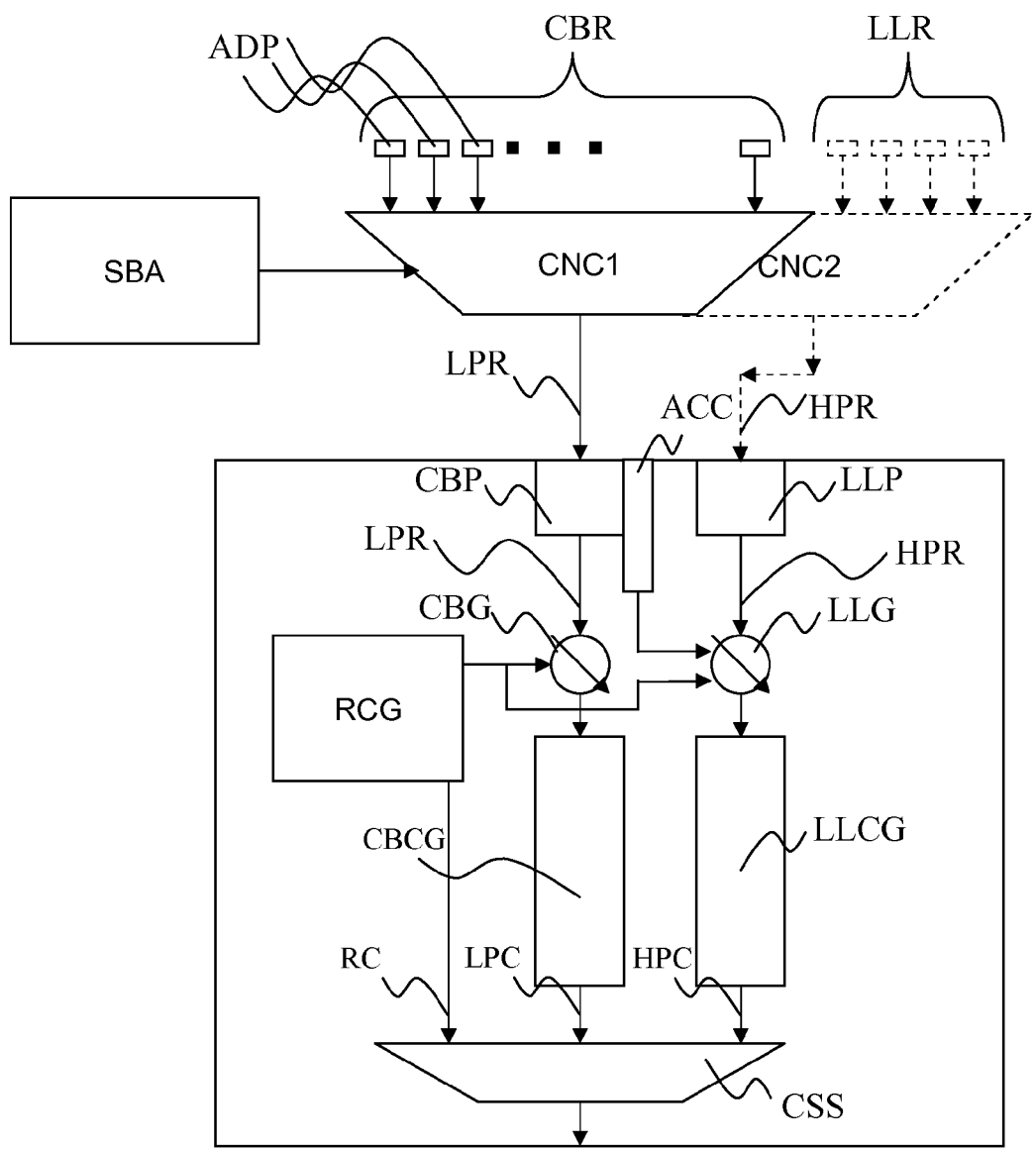
FIG. 1 shows a memory controller as known from the prior art.

CBR constant-bandwidth request
LLR low-latency request
ADP adaptor
RFR refresh request
CNC1 first time-multiplexer/first concentrator
CNC2 second time-multiplexer/second concentrator
SBA slot-based arbiter
LPR low-priority request (constant-bandwidth)
HPR high-priority request (low-latency)
CBP first port for low-priority (constant-bandwidth) requests
LLP second port for high-priority (low-latency) requests
ACC accounting unit
CBG first control gate for low-priority requests
LLG second control gate for high-priority requests
LLG' adapted (simplified) control gate in accordance with the invention
RCG refresh command generator
RRG refresh request generator (including adaptor)
CBCG first queue for low-priority requests (including first command generator)
LLCG second queue for high-priority requests (including second command generator)
RC refresh command
LPC low-priority command (constant-bandwidth)
HPC high-priority command (low-latency)
CSS command selection stage
CSS' adapted command selection stage in accordance with the invention

DETAILED DESCRIPTION OF THE PREFERRED EMBODIMENT

The invention aims at providing a memory controller for a System-on-Chip in which an off-chip volatile memory is shared amongst a plurality of agents. The agents need access to the memory at different moments in time. Such access must be controlled. Multiple requests may occur simultaneously of which some requests have a higher priority (because the operation involved is more critical in terms of latency) than others. For other requests latency is less important, but bandwidth guarantees are more important. Such requests may typically be serviced later when there are no higher priority requests, i.e. arbitration is required. This arbitration scheme is rendered even more complicated because of refresh commands, which are necessary in order to let the volatile memory keep its data. Most of the time the refresh commands are not time critical and may get the lowest priority. However, if enough time has lapsed (depending on the memory used) the refresh command may become critical as data retention is at stake. In that case the refresh commands must be serviced with the highest priority, which implies that other requests have to wait. In other words, the memory controller has to handle at least three levels of priority which are varying over time. The invention provides a convenient solution to this problem by a form of integration of the refresh commands into the low-priority request stream, which implies that the memory controller only has to arbitrate between two levels of priority. In embodiments of the memory controller (using internal queues) further advantages appear such as a reduced average latency for the high-priority (low-latency) requests.

In order to facilitate the discussion of the detailed embodiments a few expressions are defined hereinafter.

Throughout this description the term "System-on-Chip (SoC or SOC)" refers to the integration of all components of a computer or other electronic system into a single integrated circuit (chip). It may contain digital, analog, mixed-signal, and often radio-frequency functions, all components of which being on one chip. A typical application is in the area of embedded systems.

Throughout this description the term "agent" must be considered as synonym to IP block, IP core, logic core, and functional block, all of which referring to a certain component of a SoC, which may be sold individually by third parties as software, firmware and hardware.

Throughout this description the term "volatile memory" refers to a memory, which requires regular refreshing to maintain its data. Typical examples of such memory are dynamic-random-access-memory (DRAM) and synchronous-dynamic-random-access-memory (SDRAM). Of the latter different generations exist on the market, i.e. (single data rate) SDRAM, DDR SDRAM, DDR2 SDRAM, and DDR3 SDRAM. In DDR (double-data-rate) SDRAM's data is transmitted on each clock edge, i.e. twice per clock cycle. In DDR2 and DDR3 the bandwidth per clock cycle is doubled again.

Throughout this description the term "request" is to be interpreted as requests for a single transaction of an agent with the shared memory. Such transactions may have a different size for different agents, and may by either read or write transactions.

FIG. 1 shows a memory controller as known from the prior art. This figure discloses a memory controller for a System-on-Chip (SoC), wherein several agents access a shared off-chip volatile memory via the memory controller. The memory controller arbitrates between requests from the different agents. In some SoCs, such as in the example of FIG. 1, the requests are split into two categories, low latency (LL) requests LLR and constant bandwidth (CB) requests CBR.

The memory controller in FIG. 1 comprises a first time-multiplexer CNC1 for receiving the CB-requests CBR and a second time-multiplexer for receiving the LL-requests LLR. Each time-multiplexer (also being referred to as concentrator in the prior art) has a plurality of adaptors ADP, wherein each adaptor may be configured for a different transaction size (being adapted to the memory access requirements of the corresponding agent connected to it). The time-multiplexers are each connected to a slot-based arbiter SBA which determines the order in which the respective requests CBR, LLR on the adaptors ADP are put on the respective outputs of the time-multiplexers CNC1, CNC2, i.e. which time-slot of the outputs is assigned to which adaptor/request. The requests are provided to the memory controller in a memory protocol. Examples of such memory protocols are memory-transaction-language (MTL) used in NXP's SoCs and the more widely spread AXI protocol. The first time-multiplexer CNC1 ensures that a time-multiplexed stream of low-priority (CB) requests LPR is provided to a first port CBP. The second time-multiplexer CNC2 ensures that a time-multiplexed stream of high-priority (LL) requests HPR is provided to a second port LLP. It must be noted that both streams are not necessarily continuous in time; it depends on the request supply on the adaptors ADP. It must be noted that in this description (and in the claims) the time-multiplexers CNC1, CNC2 are discussed as forming part of the memory controller. However, this is a matter of definition. In accordance with other definitions such multiplexers are being considered as pre-blocks before the memory controller forming part of the memory access network (which also includes the adaptors). Embodiments of the memory controller comprising the multiplexers may, in accordance with such other definition, be renamed to memory interface (comprising the memory controller AND the memory access network). This implies that, no matter which definition is chosen, all such definitions fall within the scope of the invention.

In the memory controller of FIG. 1, the CB-requests CBR are guaranteed a limited latency and a constant rate by an accounting mechanism, a so-called CB-account has to be maintained which keeps track of the latitude with respect to the latency-rate guarantee of the CB stream. The LL-requests have the highest priority and the CB-requests and refresh commands (internally generated) are serviced when there are no LL-requests, i.e. these requests have a lower priority. When the CB-account reaches a certain threshold value (BOOST), the LL-requests are blocked and the CB-requests get serviced. In that way the CB-requests get a guaranteed maximum latency and a minimum rate. An accounting unit ACC is provided and connected to the first port CBP for maintaining the CB-account. The first port CBP is connected to a first queue CBCG via a first control gate CBG. The second port LLP is connected to a second queue LLCG via a second control gate LLG. Each queue CBCG, LLCG comprises at its output side a command generator (not shown) for generating commands LPC, HPC for the memory.

Each of the control gates CBG, LLG is controlled by a refresh command generator RCG. The second control gate LLG is also controlled by the accounting unit ACC. The command generators in the queues CBCG, LLCG are connected to a command selection stage CSS, which determines which command (LPC, HPC) gets access to the memory. The command selection stage CSS has a third input for receiving refresh commands from the refresh command generator RCG. The way the configuration of FIG. 1 performs the earlier-mentioned arbitration is already partially discussed above and is discussed in more detail hereinafter.

A possible accounting mechanism (carried out by the accounting unit ACC) is as follows. A CB-account value is maintained. The CB-account value is always between zero and a maximum value (CLIP). The CB-account value is incremented with a first value (DEN) when CB-requests are given service or when there are no CB-requests pending. The meaning of "giving service" should be (in transaction-based accounting) data transfer for when a transaction is started or when it has been completed; in any case one definition should be selected for all transactions. The CB-account value is decremented by a second value (NUM) when there are CB-requests pending and not being serviced. DEN and NUM are two values used to describe the transaction rate of the CB-traffic (CB-stream). The bandwidth is:

NUM/DEN×total available bandwidth.

In case of transaction rate accounting, the total available transaction rate is not fixed (it fluctuates with the durations of the transactions). In that case, a nominal transaction rate is defined for the memory interface, and the guaranteed CB transaction rate (cbtr) is:

NUM/DEN×nominal transaction rate.

In the above-mentioned formula the desired and the nominal transaction rate are both expressed in transactions/sec. Factor NUM/DEN defines a multiplication factor. The nominal transaction rate would be defined as bandwidth divided by the "average" transaction size for the CB traffic.

The maximum value of the CB-account corresponds to the maximum latency, up to the factor (NUM). The guaranteed maximum latency (cbl as will be explained later) equals:

CLIP/NUM.

As already mentioned, refresh commands are generated internally in the memory controller by the refresh command generator RCG. Refresh commands RC normally have the lowest priority, but both LL and CB-requests are blocked when there is a risk of data loss in the volatile memory (here a DRAM).

A possible implementation of the refresh clock generator is here described. The refresh clock generator RCG in the memory controller comprises two counters (not shown). A first counter (Counter1) counts clock cycles and emits a pulse with a regular period. The length of the period is programmable and dependent on the type of the DRAM that is connected to the SoC. A typical period is 7.8125 microseconds. Counter1 counts down to zero, with a decrement value of 1 and a decrement rate of once count per cycle. At zero a pulse is emitted and Counter1 is reset to its base value. A second counter (Counter2) is connected with its input to the output of Counter 1. Counter 2 is incremented with an increment value of 1 when it receives a pulse from Counter1. Counter2 counts how many pending refresh commands there are. When a refresh command is serviced, Counter2 is decremented with a decrement value of 1. There is a maximum allowed number of pending refresh commands. That number is dependent on the type of the memory (here DRAM) and the period used in Counter1. Typical values are between 2 and 8. When Counter2 reaches the maximum value a refresh command has to be serviced before Counter1 reaches zero. This is achieved by blocking both the LL-requests and CB-requests until Counter2 has been decremented again (a refresh command is serviced). The initial value of Counter1 determines the maximum interval between two subsequent refresh commands, given the maximum value for Counter2 and the clock frequency of the memory. The design of a refresh clock generator is known to the person skilled in the art.

LL-requests are thus blocked when the maximum allowed number of pending requests has its maximum value and/or when the CB-account value is lower than the threshold value (boost value). CB-requests are only blocked when the maximum allowed number of pending requests has its maximum value Between the point where the LL and CB-requests can be blocked and the physical interface to the memory, there are the queues CBCG, LLCG. As already mentioned, in the memory controller of FIG. 1, in the respective queues there is a command generator for the CB-requests and a command generator for the LL-requests. The queues are fairly complex in order to optimize memory efficiency (no lost cycles due to command interference). A number of transactions can be in progress in the queues. The exact number depends on the memory configuration, the transaction size, etc. In other words, because of the presence of the queues CBCG and LLCG, it takes some time from blocking higher priority requests until service is given to lower priority requests. This may be the case when the CB-requests CBR are boosted (getting a temporarily-higher priority than the LL-requests LLR), or when the refresh commands have to be serviced (getting a temporarily-higher priority than both the LL-requests CBR and the CB-requests LLR). Hereinafter, the combination of queue and command generator is also being referred to as command generation stage.

To provide the guaranteed service on the CB port, the threshold value must be set so that the CB-account never reaches zero taking into account the delay caused by the command generation stages.

As already mentioned, the known memory controllers, such as the one of FIG. 1, suffer from the problem that the arbitration is relatively complex, i.e. there are effectively three priority levels while there are only two ports. This problem is caused by the refresh commands which now and then become "urgent" commands. The inventors have discovered that the memory controller of FIG. 1 also suffers from a further disadvantage, which is explained hereinafter.

The threshold value (BOOST) for the CB traffic is determined based on the fact that:
(1) There may be LL-requests in the queue, and
(2) The refresh command generator could raise an alarm (risk of loss of data) and block the CB-requests LPR before the CB-requests get serviced. This can be a significant time.

For example, assuming a command generation stage pipeline corresponding to at most 40 clock cycles and a refresh time of 127.5 ns (for a 1 Gbit DRAM device for example, corresponding to 68 cycles when the clock period is 1.875 ns). Once the CB-account reaches the threshold value, first the respective command generation stage (pipeline) LLCG is emptied, taking up to 40 clock cycles. Then, in the worst case, the CB-requests are blocked, because of the refresh command generator having raised an alarm. Now the command generation stage (pipeline) CBCG of the low-priority requests CBR is emptied, taking again up to 40 cycles. When both command generation stages (LLCG, CBCG) are empty, the refresh command will be selected. As soon as the refresh command RC has been sent to the memory, the alarm is withdrawn and the command generation stage CBCG (pipeline) fills up again. When the refresh action is completed after 68 cycles, the pending CB-requests LPR are serviced until the CB-account reaches above the threshold level.

The time to service the non-blockable LL-requests HPR and the non-blockable CB-requests LPR depends on several factors, including the size of the requests, the state of the queues, bank conflicts, and how many read/write turnarounds are necessary.

The threshold value must be computed for the worst case situation, i.e. that the command generator raises the alarm just after the CB-account has reached the threshold level. Most of the time this worst-case situation does not occur. Then, the LL-bursts are blocked at reaching the threshold value of the CB-account although there is no immediate risk that the CB-account would reach zero. The LL-requests LLR thus get a longer average latency than necessary.

The inventors have observed that the requirements of the refresh commands and the CB-commands are very similar. Therefore, in the invention it is suggested to treat them as one flow. This is achieved by including the refresh commands as refresh requests in the CB-request stream.

Figure 2:
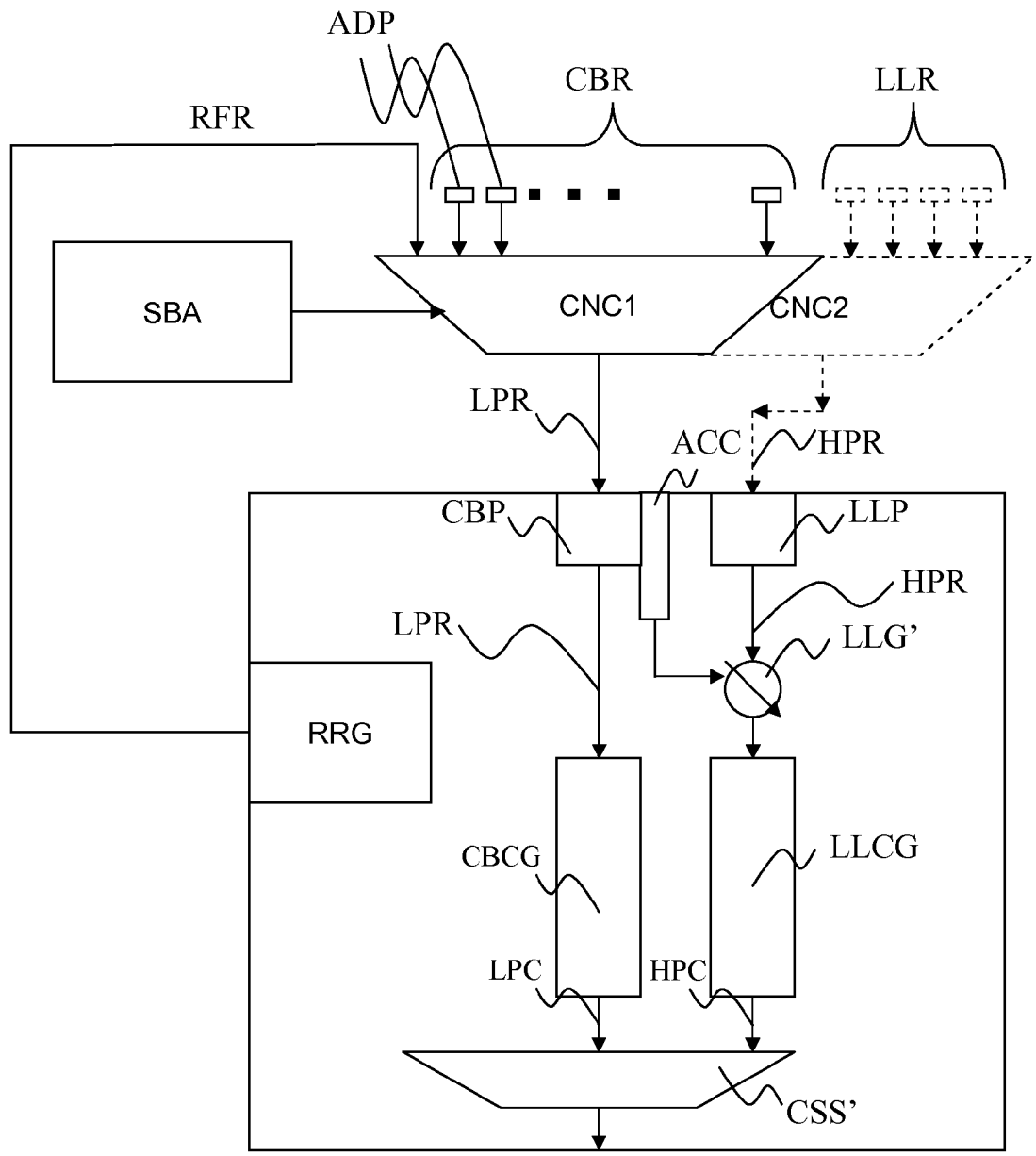
FIG. 2 shows a memory controller in accordance with the invention.

FIG. 2 shows a memory controller in accordance with the invention. The main differences between FIG. 1 and FIG. 2 are that there is no longer a control gate before the low-priority CB-queue CBQ. Furthermore, the control gate LLG' before the high-priority LL-queue is now only controlled by the accounting unit ACC. Also, the refresh command generator has been replaced with a refresh request generator RRG, which does not control the control gate LLG', but generator refresh requests RFR to be fed back to the first time-multiplexer CNC1. A last main difference is that the command selection stage CSS' has been simplified in that it only needs to arbitrate/prioritize between the two queues, i.e. the command selection stage CSS' no longer receives refresh commands from a refresh command generator. As a consequence, the threshold value for the CB account can be chosen much tighter, which reduces the average latency for the LL-requests LLR.

In NXP SoCs, the CB-requests CBR are concentrated in a time-multiplexer/concentrator CNC1 with a slot-based arbitration scheme controlled by the slot-based arbiter SBA. In each slot one request is passed to the first port CBP. One request corresponds to one transaction.

The CB-port CBP of the memory controller can guarantee a minimum transaction rate (cbtr), and a maximum latency for the transaction stream (cbl). This is achieved by setting the parameters of the accounting mechanism. The relation between the minimum transaction rate (cbtr) and the accounting parameters is given by the following formula:

$$Cbtr = NUM/DEN \times \text{nominal transaction rate}.$$

If the total number of time slots per complete roundtrip of the time-multiplexer is known (N) and the number of time slots per adaptor ADP is known (n[i]), the transaction rate per adaptor is guaranteed to be equal to or more than:

$$n[i]/N \times cbtr.$$

If the maximum distance between two time slots per adaptor ADP (counting round over the edge of the slot table of the time-multiplexer CNC1 and slot-based arbiter SBA) is known as well (d[i]) then the latency per adaptor is guaranteed to be less than or equal to:

$$cbl + d[i] \times cbtr.$$

The refresh requests RFR are represented on the on-chip interfaces by a special code, e.g. writing to address 0 with write mask fully disabled. Any other signal combination that will never occur in the system is also possible.

The invention incorporates a refresh request generator (RRG) instead of a refresh command generator (RCG in FIG. 1). The special signal combination for a refresh command is generated by the refresh request generator RRG, and recognized by the command selection stage CSS' in the memory controller. In order to keep the knowledge of the special code in one place, it is proposed to incorporate the refresh request generator RRG in the memory controller. However, this is not essential. If may be a block anywhere in the System-on-Chip or be part of any one of the plurality of agents. The refresh request generator RRG can be less complex than the refresh command generator (RCG) used in prior art, since it is no longer responsible for blocking the low-priority requests LPR and the high-priority requests HPR. A single down counter suffices to ensure that the requests are generated at a desired rate. In FIG. 2 the refresh request generator RRG inside the memory controller is connected to the first time-multiplexer CNC1, just like any one of the other adaptors connected to this time-multiplexer CNC1.

For the refresh request generator RRG the following calculations can be made. The necessary rate (rRRG) is easily computed from the specification in the memory (DRAM/SDRAM) datasheet. The number of time slots (per complete roundtrip) for the refresh request generator RRG (n[RRG]) must be chosen such that:

$$n[RRG]/N \times cbtr > rRRG$$

and the time slots must be assigned such that:

$$cbl + d[RRG] \times 1/cbtr < lRRG,$$

where parameter lRRG is the maximum allowed latency for a refresh request.

For example, for a given DRAM, having the following specifications:
rRRG=1/7.8125 s=128 ktr/s (kilo transactions per second), and lRRG=15 s,
which is used in a SoC having the following requirements/specifications:
cbtr=6.25 Mtr/s (mega transactions per second), cbl=2 s, and N=128,
the following calculation can be made:

$$n[RRG] > 128\ k/6.25M \times 128 = 2.6 \rightarrow n[RRG] = 3,$$
$$\text{and } d[RRG] < (15-2) \times 6.25 \rightarrow d[RRG] < 81.25.$$

Here it must be noted that, in this example, although the guaranteed rate for the refresh requests is $$3/128 \times 6.25\ Mtr/s = 146\ ktr/s$$

no more than 128 ktr/s are generated by the refresh request generator RRG. It can be concluded that the refresh overhead is not higher than in the memory controllers of the prior art.

Instead of assigning multiple time slots to the adaptor to which the refresh request generator RRG is connected, the refresh request generator may also be coupled to more than one input of the time-multiplexer CNC1.

The memory controllers as known from the prior art generate refresh commands internally and use a dedicated mechanism to arbitrate between the refresh commands and normal commands. In those memory controller there are thus effectively three types of commands present at the command selection stage CSS, LL commands, CB commands, and refresh commands. In the invention the refresh requests are concentrated with the CB-requests before being fed into the CB-port CBP. Thereby the memory controller of the invention only has to arbitrate between LL-requests and CB-requests. This can be noted clearly when comparing FIG. 1 and FIG. 2.

Important advantages of the invention can be summarized as follows:
In the invention the arbitration in the memory controller becomes less complex, which allows for higher clock frequency (this holds for all embodiments);
In the invention the refresh commands are included as refresh requests in the stream of low-priority requests LPR. Thereby, the LL-requests can be blocked only by one reason and the threshold value (BOOST) can be lower. This leads to lower average latency for the LL-requests (this holds for all embodiments), and
The accounting parameters for the CB-account and how they translate into guarantees must be mentioned in the data sheet, which renders the invention detectable.

It must be noted that in the Figures only the control flow is shown. The data flows are omitted. The only aspect of the data flow relevant for this invention is detecting the start or completion of the data transfer corresponding with the transaction. In both definitions (which is a matter of choice), the port is aware of the event. Both options are workable solutions; the difference is in defining the acceptable latency, which is longer when the transactions are counted on completion than when the transactions are counted at the start of the transfer. In accordance with the definition chosen, a transaction is considered pending as long as the data transfer has not started or is not yet completed.

The invention thus provides a memory controller for use in a System-on-Chip connected to an off-chip volatile memory, wherein the System-on-Chip comprises a plurality of agents which need access to the volatile memory. The memory controller comprises a first port CBP for receiving low-priority requests CBR for access to the volatile memory from a first-subset of the plurality of agents and a second port LLP for receiving high-priority requests LLR for access to the volatile memory from a second-subset of the plurality of agents, wherein the memory controller is configured for arbitrating between the high-priority requests LLR and the low-priority requests CBR, wherein the memory controller is configured for receiving refresh requests RFR for the volatile memory via the first port CBP, wherein the refresh requests RFR are time-multiplexed with the low-priority requests CBR, wherein the memory controller is configured for treating the low-priority requests CBR and the refresh requests RFR the same. The effect is that the arbitration between the different requests is rendered less complex. In embodiments of the memory controller there is also an average latency reduction for the high-priority requests. The invention further provides a System-on-Chip comprising the memory controller, and a method of a refresh request generator for use in such System-on-Chip. The invention also provides a method of controlling access of a System-on-Chip to an off-chip volatile memory, wherein the System-on-Chip comprises a plurality of agents which need access to the volatile memory, and a computer program product comprising instructions for causing a processor to perform such method.

The invention may be applied in various application areas. For example, the invention may be applied in a System-on-Chip, wherein a plurality of agents communicated via a shared volatile memory. The invention may also be applied in the memory controller of the Nexperia™ SoC from NXP. The refresh representation on the on-chip interfaces could be included in the memory interface protocols such OCP, AXI, or MTL.

Various variations of the memory controller, system and method in accordance with the invention are possible and do not depart from the scope of the invention as claimed.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth. These instructions may be subdivided into subroutines and/or be stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage. Throughout the Figures, similar or corresponding features are indicated by same reference numerals or labels.

The invention claimed is:

1. A memory controller for use in a System-on-Chip connected to an off-chip volatile memory, wherein the System-on-Chip includes a plurality of agents, which need access to the volatile memory, wherein the memory controller comprises;
   a first port (CBP) for receiving low-priority requests (CBR) for access to the volatile memory from a first-subset of the plurality of agents
   a second port (LLP) for receiving high-priority requests (LLR) for access to the volatile memory from a second-subset of the plurality of agents, and
   a first time-division multiplexer (CNC1) comprising inputs in communication with the first subset of the plurality of agents and an output in communication with the first port (CBP), wherein at least one of the inputs is configured to receive refresh requests (RFR),
   wherein the memory controller is configured for arbitrating between the high-priority requests (LLR) and the low-priority requests (CBR),
   wherein the memory controller is configured for receiving the refresh requests (RFR) for the volatile memory via the first port (CBP),
   wherein the first time-division multiplexer (CNC1) time-division multiplexes the refresh requests (RFR) with the low-priority requests (CBR), and
   wherein the memory controller is configured for treating the low-priority requests (CBR) and the refresh requests (RFR) the same.

2. The memory controller as claimed in claim 1, wherein the arbitrating comprises determining an order in which the high-priority requests (LLR) and the low-priority requests (CBR) may be serviced by the memory.

3. The memory controller as claimed in claim 2, wherein the high-priority requests (LLR) are latency-critical.

4. The memory controller as claimed in claim 3, wherein the low-priority requests (CBR) are latency-tolerant.

5. The memory controller as claimed in claim 4, wherein the memory controller is configured for guaranteeing, at request stream level, for the low-priority requests (CBR) a minimum guaranteed bandwidth and a maximum latency to the volatile memory.

6. The memory controller as claimed in claim 5, wherein the memory controller is configured for arbitrating between the high-priority requests (LLR) and the low-priority requests (CBR) such that, in operational use,
   the high-priority requests (LLR) that are pending on the second port (LLP) are serviced first, and
   the low-priority requests (CBR) that are pending on the first port (CBP) are serviced when there are no high-priority requests (LLR) pending, unless the guaranteeing of the minimum guaranteed bandwidth and the maximum latency is at risk, in which case the low-priority requests (CBR) are serviced ahead of pending high-priority requests (LLR) until the minimum guaranteed bandwidth and the maximum latency can be guaranteed again.

7. The memory controller as claimed in claim 1, wherein the first port (CBP) comprises a first port output, wherein the first port (CBP) is configured for extracting low-priority bursts from the low-priority requests (CBR) and the refresh requests (RFR) and sequentially releasing said low-priority bursts on the first port output, and wherein the second port (LLP) comprises a second port output, the second port (LLP) being configured for extracting high-priority bursts from the high-priority requests (LLR) and sequentially releasing said high-priority bursts on the second port output, wherein the memory controller further comprises:
   an accounting unit (ACC') being coupled to the first port (CBP) and being configured for monitoring the arbitrating between said requests (CBR, LLR, RFR);
   a first queue (CBCG) having a first queue input and a first queue output, wherein the first queue input is coupled to the first port output for storing a predefined number of low-priority bursts, wherein the first queue (CBCG) comprises a first command generator connected to the first queue output for generating low-priority commands (LPC) from the low-priority bursts;
   a control gate (LLG') for conditionally blocking high-priority requests from the second port (LLP);
   a second queue (LLCG) having a second queue input and a second queue output, wherein the second queue input is coupled to the second port output for storing a predefined number of high-priority bursts, wherein the second queue (LLQ) is coupled to the second port output via the control gate (LLG') that is controlled by the accounting unit (ACC'), wherein the second queue (LLCG) comprises a second command generator connected to the second queue output for generating high-priority commands (HPC) from the high-priority bursts, and a command-selection stage (CSS') comprising a first command input coupled to the first command generator and a second command input coupled to the second command generator, the command selection stage (CSS') being configured for selecting the command (LPC, HPC) to be sent to the volatile memory.

8. The memory controller as claimed in claim 1, further comprising a refresh request generator (RRG) for generating the refresh requests (RFR).

9. A memory controller for use in a System-on-Chip connected to an off-chip volatile memory, wherein the System-on-Chip includes a plurality of agents, which need access to the volatile memory, wherein the memory controller comprises;
- a first port for receiving latency-tolerant requests for access to the volatile memory from a first-subset of the plurality of agents and
- a second port for receiving latency-critical requests for access to the volatile memory from a second-subset of the plurality of agents,
- wherein the memory controller is configured for arbitrating between the latency-critical requests and the latency-tolerant requests,
- wherein the memory controller is configured for receiving refresh requests for the volatile memory via the first port,
- wherein the refresh requests are time-division multiplexed with the latency-tolerant requests,
- wherein the memory controller is configured for treating the latency-tolerant requests and the refresh requests the same,
- wherein the arbitrating comprises determining an order in which the latency-critical requests and the latency-tolerant requests may be serviced by the memory,
- wherein the memory controller is configured for guaranteeing, at request stream level, for the latency-tolerant requests a minimum guaranteed bandwidth and a maximum latency to the volatile memory, and
- wherein the memory controller is configured for arbitrating between the latency-critical requests and the latency-tolerant requests such that, in operational use,
  - the latency-critical requests that are pending on the second port are serviced first, and
  - the latency-tolerant requests that are pending on the first port are serviced when there are no latency-critical requests pending, unless the guaranteeing of the minimum guaranteed bandwidth and the maximum latency is at risk, in which case the latency-tolerant requests are serviced ahead of pending latency-critical requests until the minimum guaranteed bandwidth and the maximum latency can be guaranteed again.

10. A memory controller for use in a System-on-Chip connected to an off-chip volatile memory, wherein the System-on-Chip includes a plurality of agents, which need access to the volatile memory, wherein the memory controller comprises;

- a first port (CBP) for receiving low-priority requests (CBR) for access to the volatile memory from a first-subset of the plurality of agents and
- a second port (LLP) for receiving high-priority requests (LLR) for access to the volatile memory from a second-subset of the plurality of agents,
- wherein the memory controller is configured for arbitrating between the high-priority requests (LLR) and the low-priority requests (CBR),
- wherein the memory controller is configured for receiving refresh requests (RFR) for the volatile memory via the first port (CBP),
- wherein the refresh requests (RFR) are time-division multiplexed with the low-priority requests (CBR),
- wherein the memory controller is configured for treating the low-priority requests (CBR) and the refresh requests (RFR) the same,
- wherein the first port (CBP) comprises a first port output, wherein the first port (CBP) is configured for extracting low-priority bursts from the low-priority requests (CBR) and the refresh requests (RFR) and sequentially releasing said low-priority bursts on the first port output, and wherein the second port (LLP) comprises a second port output, the second port (LLP) being configured for extracting high-priority bursts from the high-priority requests (LLR) and sequentially releasing said high-priority bursts on the second port output, wherein the memory controller further comprises:
  - an accounting unit (ACC') being coupled to the first port (CBP) and being configured for monitoring the arbitrating between said requests (CBR, LLR, RFR);
  - a first queue (CBCG) having a first queue input and a first queue output, wherein the first queue input is coupled to the first port output for storing a predefined number of low-priority bursts, wherein the first queue (CBCG) comprises a first command generator connected to the first queue output for generating low-priority commands (LPC) from the low-priority bursts;
  - a control gate (LLG') for conditionally blocking high-priority requests from the second port (LLP);
  - a second queue (LLCG) having a second queue input and a second queue output, wherein the second queue input is coupled to the second port output for storing a predefined number of high-priority bursts, wherein the second queue (LLQ) is coupled to the second port output via the control gate (LLG') that is controlled by the accounting unit (ACC'), wherein the second queue (LLCG) comprises a second command generator connected to the second queue output for generating high-priority commands (HPC) from the high-priority bursts, and
  - a command-selection stage (CSS') comprising a first command input coupled to the first command generator and a second command input coupled to the second command generator, the command selection stage (CSS') being configured for selecting the command (LPC, HPC) to be sent to the volatile memory.

* * * * *